April 15, 1924.
R. F. STANTON
TAILSTOCK
Filed April 4, 1921
1,490,405
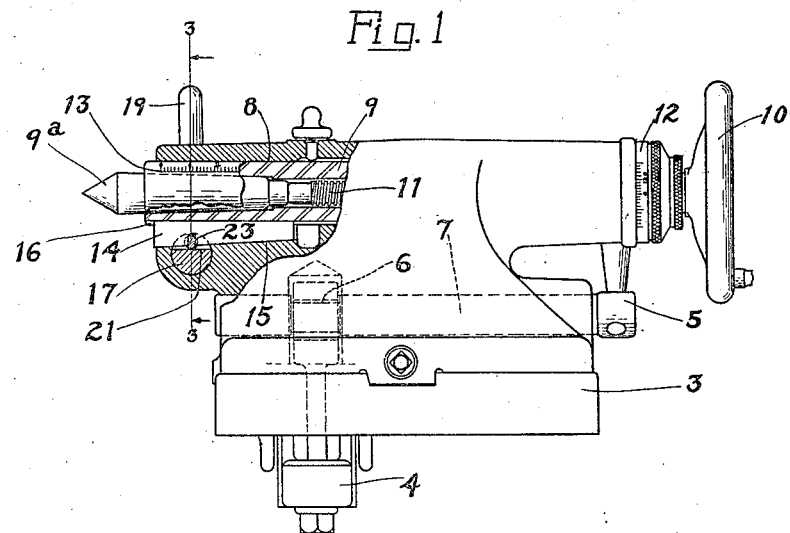
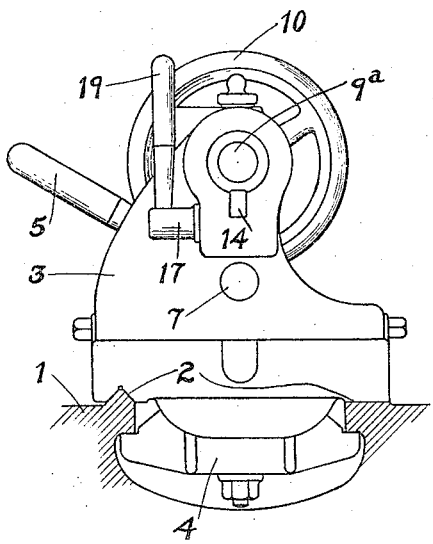
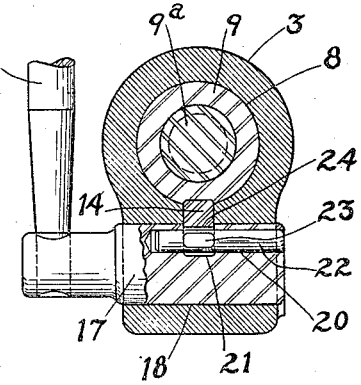
Inventor
R. F. Stanton
By Joseph K. Schofield
Attorney Patented Apr. 15, 1924.

1,490,405

UNITED STATES PATENT OFFICE.

RICHARD F. STANTON, OF HARTFORD, CONNECTICUT, ASSIGNOR TO PRATT & WHITNEY COMPANY, OF NEW YORK, N. Y., A CORPORATION OF NEW JERSEY.

TAILSTOCK.

Application filed April 4, 1921. Serial No. 458,267.

*To all whom it may concern:*

Be it known that I, RICHARD F. STANTON, a citizen of the United States, residing at Hartford, in the county of Hartford and State of Connecticut, have invented certain new and useful Improvements in Tailstocks, of which the following is a specification.

This invention relates to tailstocks and particularly to an improved mechanism for clamping the tailstock center supporting spindle in its work-engaging position. The primary object of the invention is to provide an improved clamping mechanism of the type and for the purpose stated which will securely clamp the spindle in the work-engaging position without danger of offsetting the spindle and work relative to the tool in any objectionable manner due to any slight looseness of the spindle in its support. Another object of the invention is to provide a spindle clamping means which, in addition to clamping the spindle, will at all times prevent the rotation thereof in the tailstock.

With these and other objects in view my invention consists in the features of construction and operation set forth in the following specification and illustrated in the accompanying drawing.

Referring to the figures of the drawing:

Figure 1 is a side elevation of the tailstock showing a portion thereof in longitudinal vertical section.

Fig. 2 is a front end view thereof.

Fig. 3 is an enlarged transverse vertical section through the clamping mechanism on line 3—3 of Fig. 1.

The present invention comprises a tailstock clamping means which is extremely simple in construction and provides a secure and accurate clamp for the tailstock spindle as well as a key preventing the rotation of the spindle in its support. This clamping means comprises a sliding wedge key adapted to be operated preferably by a rotary element provided with an operating handle and engaging the wedge in any suitable manner. It will be understood that the wedge fits its engaging elements very accurately and therefore only a very slight movement of the wedge is necessary to clamp or release the spindle.

In tailstock constructions, however accurate the fit of the sleeve or spindle within the tailstock opening may be, it is impossible to secure such accuracy as to absolutely prevent a slight lateral movement of the spindle when using a clamping means against one side thereof. In the usual form of tailstock wherein this clamp is placed in a relatively horizontal position at one side of the spindle, the clamping of the same tends to move the spindle and work support thereby in a direction directly toward or from the tool thus resulting in inaccurately turning the work to a slight taper. It will be noted that the spindle engaging the wedge used in the present construction lies in a vertical plane passing through the spindle whereby any lateral movement of the spindle caused by the action of the wedge will be in a vertical plane and not in a direction toward or from the tool. It therefore follows that with the use of a clamping member positioned in a vertical plane as illustrated herein, the slight lateral movement of the spindle due to the clamping operation will in no degree effect the accuracy of the work performed.

The specific construction illustrated will now be described.

1 illustrates the bed of a lathe on ways 2 of which the tailstock 3 is adjustable and adapted to be secured in adjusted position by means of a clamping element 4 operated by means of a handle 5 and an eccentric 6 on a shaft 7.

The upper portion of the tailstock is provided with a longitudinal opening 8 in which is slidably mounted a spindle 9 adapted to support a work-engaging center 9ª therein. The spindle may be moved longitudinally by rotating the hand wheel 10 which is mounted on a screw 11 threadedly engaging the spindle in the usual manner. A graduated dial 12 is adapted to indicate the amount of rotation given the hand wheel and graduations 13 on the forward portion of the spindle may be read by the operator to determine the projection of the spindle as the same is forced outwardly.

The novel means for clamping the spindle in position comprises a wedge 14 longitudinally slidably mounted in a groove or keyway 15 in the forward end of the body portion of the tailstock. I also preferably provide a keyway 16 in the spindle directly opposite or in alignment with the keyway 15 whereby the wedge also serves to prevent rotation of the spindle within its support. The wedge is adapted to be very accurately fitted within its keyway whereby only a slight longitudinal movement therein is required to clamp or release the spindle. It should also be noted that the wedge is positioned in a vertical plane passing through the spindle whereby any lateral movement of the spindle caused by the action of the wedge will be in a vertical direction and therefore not directly toward or from the tool in a manner to cause inaccuracy in the finished work as described above.

The means for operating the wedge 14 comprises a rotary member 17 mounted in a bore 18 and provided with an operating handle 19. A bore 20 and a transverse recess 21 are provided in this member for receiving a pin 22 and the wedge 14 respectively. The pin 22 is flatted at opposite sides 23 at the center thereof, as illustrated, whereby the same is secured within a transverse recess 24 formed in the wedge. It will be seen that when assembled the pin secures the wedge to the rotary member whereby a slight rotation of the latter is adapted to slide the wedge. The recess 21 in the rotary member, as illustrated, is cut deep enough to permit the slight rotation of the member necessary to move the wedge.

It should be understood that the wedge and its operating mechanism are assembled into place before the spindle 9 is inserted into its opening 8. The member 17 with the pin 22 in place therein is first inserted in its bore 18 with the recess 21 uppermost. The wedge 14 is then placed in the spindle opening 8 and dropped into its keyway 15 with the recess 24 in the wedge in engagement with the flat sides 23 of the pin 22. The pin thus forms an operative connection between the member 17 and the wedge. The spindle may thereafter be inserted in its opening 8 in a position to engage the keyway 16 thereof with the wedge.

What I claim is:

1. A tailstock comprising the combination of a body portion having a longitudinal opening therein, a center supporting spindle slidably mounted in the opening, means for moving the spindle longitudinally, a wedge fitting in aligned longitudinal keyways in the spindle and body portion, and means for moving the wedge longitudinally to clamp the spindle in the opening.

2. A tailstock comprising the combination of a body portion having a longitudinal opening therein, a center supporting spindle slidably mounted in the opening, means for moving the spindle longitudinally, a wedge fitting in a longitudinal keyway in the forward end of the body portion and engaging the spindle, a wedge engaging member mounted in a transverse bore in the forward end of the body portion, and a handle for rotating the member to move the wedge longitudinally.

3. A tailstock comprising the combination of a body portion having a longitudinal opening therein, a center supporting spindle slidably mounted in the opening, means for moving the spindle longitudinally, a wedge fitting in a longitudinal keyway in the forward end of the body portion and engaging the spindle, a member mounted in a transverse bore in the forward end of the body portion, a pin in the member engaging within a notch in the wedge, and a handle for rotating the member to move the wedge longitudinally.

4. A tailstock comprising the combination of a body portion having a longitudinal opening therein, a center supporting spindle slidably mounted in the opening, means for moving the spindle longitudinally, a wedge fitting in a keyway extending parallel with the spindle in the body portion and bearing against the spindle, the wedge lying in a vertical plane passing through the spindle, and means for moving the wedge longitudinally to clamp the spindle in the opening.

5. A tailstock comprising the combination of a body portion having a longitudinal opening therein, a center supporting spindle slidably mounted in the opening, means for moving the spindle longitudinally, a wedge fitting in aligned longitudinal keyways in the spindle and body portion, the wedge lying in a vertical plane passing through the spindle, and means for moving the wedge longitudinally to clamp the spindle in the opening.

6. A tailstock comprising the combination of a body portion having a longitudinal opening therein, a center supporting spindle slidably mounted in the opening, means for moving the spindle longitudinally, a wedge fitting in aligned longitudinal keyways in the spindle and body portion, the wedge being beneath the spindle and lying in a vertical plane passing through the spindle, and means for moving the wedge longitudinally to clamp the spindle in the opening.

In testimony whereof, I hereto affix my signature.

RICHARD F. STANTON.